UNITED STATES PATENT OFFICE.

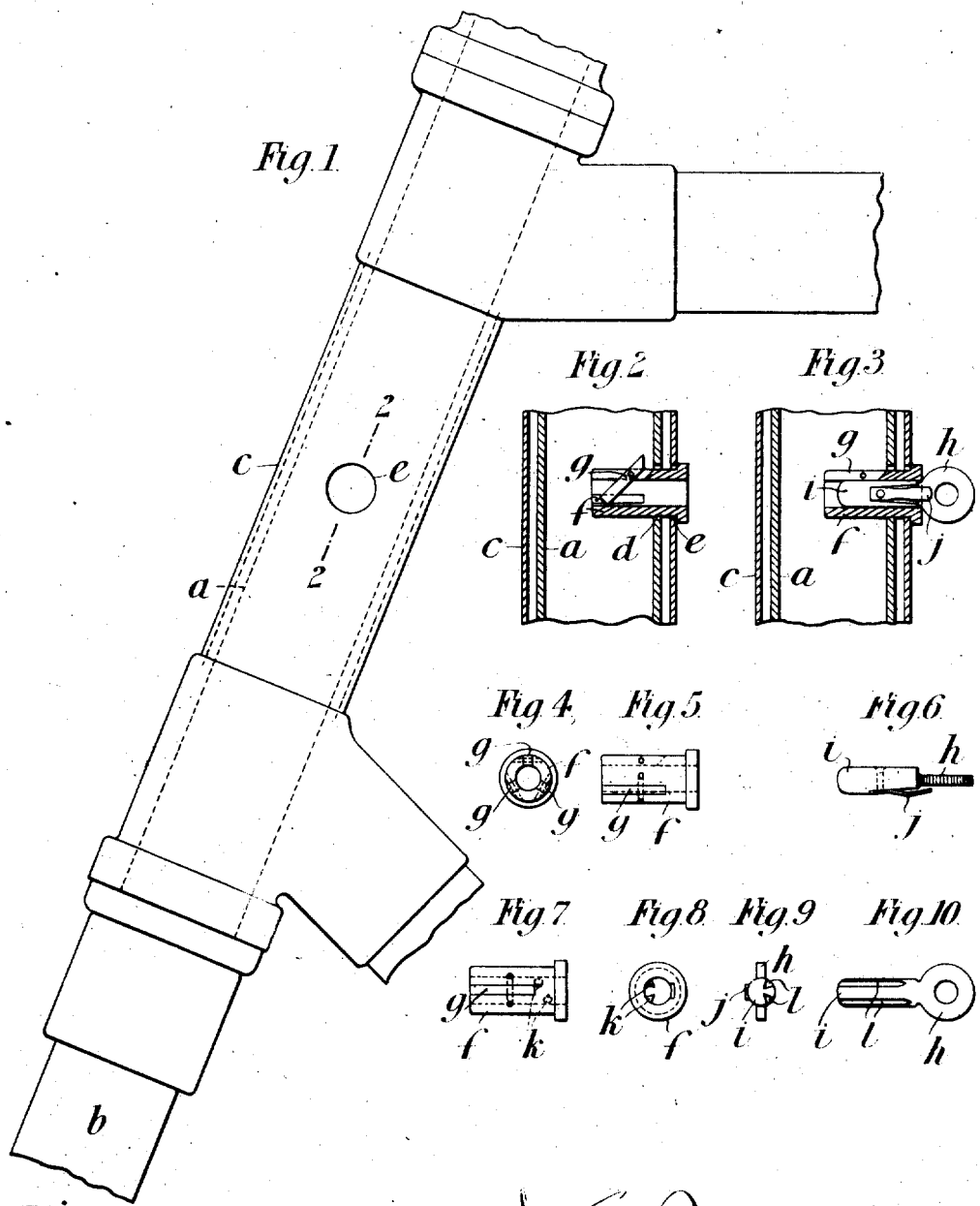

HERMAN JANSEN, OF SCHIEDAM, NETHERLANDS.

MEANS FOR LOCKING THE STEERING-HEADS OF CYCLES.

No. 903,476.　　　Specification of Letters Patent.　　　Patented Nov. 10, 1908.

Application filed February 17, 1908. Serial No. 416,369.

*To all whom it may concern:*

Be it known that I, HERMAN JANSEN, a subject of the Queen of Holland, residing at Schiedam, Netherlands, have invented new and useful Improved Means for Locking the Steering-Heads of Cycles, of which the following is a specification.

This invention relates to improved means for locking the steering heads of cycles.

According to the invention I form the steering head and the post or pillar carrying the fork and which turns within the said steering head with a hole, the said two holes being adapted to be brought opposite to one another in which position they can receive a pin or plug provided with one or more gravity or other suitable catches which engage with, or lock against, the inside of the post or pillar or of the steering head thus effectually preventing the relative movement of the post or pillar and the steering head.

To enable the pin or plug to be released it is made hollow to permit of the insertion of a key which disengages the catch or catches, thereby enabling the said pin or plug to be removed.

It will be understood that the pin or plug and the key can be so constructed that each device can only be locked and unlocked by a key specially made for the purpose.

To enable the invention to be fully understood I will describe it by reference to the accompanying drawing, in which:—

Figure 1 is a side view of the steering head of a cycle adapted to be locked according to the invention. Fig. 2 is a section on the line 2—2, Fig. 1, and showing the locking pin or plug in place. Fig. 3 is a view similar to Fig. 2 but showing the key inserted in the plug for the purpose of removing the same. Fig. 4 is an end view of the locking plug. Fig. 5 is a side view of the same. Fig. 6 is a plan view of the key for unlocking the device. Fig. 7 is a side view of a modified form of locking plug. Fig. 8 is an end view of the same. Figs. 9 and 10 are an end view and a side view respectively of the key for use with the modified form of plug.

Referring first to Figs. 1 to 6, *a* is the post or pillar carrying the fork *b* of the cycle and *c* is the steering head which is mounted upon the said post or pillar *a*. *d* is the hole which is formed in the post or pillar *a* and *e* is the corresponding hole which is made in the steering-head *c*. *f* is the pin or plug which is provided with a number (in the drawing three) of pivoted gravity catches *g*, *g*. The pin or plug *f* is made hollow, as shown, in order to permit of the insertion of a key, such as that shown in Figs. 3 and 6. This key comprises the thumb-piece *h* and the shank *i* which is of a size to enter the hollow plug *f*, and has secured to it a spring *j* so that when inserted in the said plug *f* the spring frictionally holds it in place for the purpose hereinafter described.

The device is used as follows, that is to say, the holes *d* and *e* in the post or pillar *a* and the steering head *b* respectively are brought opposite to one another, as shown in Fig. 2, and the plug *f* is then pushed into the two holes. When the plug is thus inserted it is turned until one of the catches *g* drops under the action of gravity as shown in Fig. 2, in which position its outer end bears against the inner surface of the steering post *a*, thus securely locking the said steering head to the post or pillar *a*. To release the steering head it is merely necessary to insert the key, the shank *i* of which pushes up the inner end of the locking catch *g* so that the plug *f* is free to be removed with the key to which it is caused to adhere by means of the friction of the spring *j*.

It will be understood, as above described, that each individual locking device can be constructed so that it can be opened only by a specially made key. The device can, for example, be of the shape shown in the construction above described, or it may be of any other convenient construction such, for instance, as that illustrated in Figs. 7 to 10. In this case the bore of the plug *f* is provided with internal projections *k*, *k* and the shank *i* of the key is made with grooves or recesses *l l* in a position corresponding to the said projections *k*, *k*, so that it permits of the key being inserted in the said bore when it is desired to remove the locking device.

Having now particularly described and ascertained the nature of my said invention and in what manner the same is to be performed, I declare that what I claim is:—

1. Means for locking the steering heads of cycles, comprising a hollow pin or plug having one or more catches, and holes formed respectively in the steering head and the pillar or post upon which the said head is mounted and into which holes the pin or plug is inserted, substantially as hereinbefore described.

2. The combination with a cycle steering head and post or pillar, each of which is provided with a hole, of a hollow pin or plug adapted to be inserted into the said holes and having one or more catches engaging with the inner surface of the said post or pillar or of the steering head so as to lock these two parts together, substantially as hereinbefore described.

3. A locking device for the steering heads of cycles comprising a hollow plug adapted to be inserted into holes in the steering head and post or pillar of the cycle and having one or more catches, such as gravity catches, which automatically engage with the inner surface of the steering head or post or pillar when the plug is inserted and which are released upon the insertion of a key into the locking plug, substantially as hereinbefore described.

HERMAN JANSEN.

Witnesses:
JOHANNES J. C. JANSEN,
GERARDUS M. MEYER.